United States Patent [19]

Mashimo

[11] Patent Number: 4,766,502

[45] Date of Patent: Aug. 23, 1988

[54] INFORMATION SIGNAL RECORDING APPARATUS

[75] Inventor: Akira Mashimo, Tokorozawa, Japan

[73] Assignee: TEAC Corporation, Musashino, Japan

[21] Appl. No.: 36,914

[22] Filed: Apr. 9, 1987

[30] Foreign Application Priority Data

Apr. 14, 1986 [JP] Japan .................................. 61-84347

[51] Int. Cl.$^4$ ........................ H04N 9/80; G11B 19/26
[52] U.S. Cl. .................................. 358/322; 358/330;
358/342; 369/50
[58] Field of Search .................... 369/50, 59; 358/310,
358/322, 323, 338, 342, 330

[56] References Cited

U.S. PATENT DOCUMENTS

| Re. 32,194 | 6/1986 | Machida et al. | 358/322 |
|---|---|---|---|
| Re. 32,431 | 6/1987 | Dakin et al. | 358/338 |
| 3,705,262 | 12/1972 | Kennedy et al. | 358/342 |
| 3,911,484 | 10/1975 | Mutou et al. | 358/342 |
| 3,947,870 | 3/1976 | Yumde et al. | 358/322 |
| 4,423,498 | 12/1983 | Kimura et al. | 358/322 |
| 4,481,615 | 11/1984 | Hioki | 358/342 |
| 4,499,502 | 2/1985 | Dakin et al. | 358/310 |

Primary Examiner—Donald McElheny, Jr.
Attorney, Agent, or Firm—Ladas & Parry

[57] ABSTRACT

An information signal recording apparatus records an information signal on a disc having a rotation controlling signal recording track pre-recorded with a rotation controlling signal including a rotation mode discrimination signal which indicates whether the information signal recording disc is to be rotated in a constant angular velocity mode or in a constant linear velocity mode, a reproducing circuit for reproducing the rotation controlling signal recorded on the rotation controlling signal recording track, a motor for rotating the recording disc responsive to the reproduced rotation controlling signal, a mode discriminating circuit for discriminating whether the information signal recording disc is to be rotated in the constant angular velocity mode or in the constant linear velocity mode responsive to the rotation mode discrimination signal within the rotation controlling signal reproduced by the reproducing circuit, and a frequency modulator supplied with a luminance signal for producing a frequency modulated luminance signal. The frequency modulator changes a predetermined carrier reference frequency responsive to a discrimination result in the mode discriminating circuit.

9 Claims, 5 Drawing Sheets

INFORMATION SIGNAL RECORDING APPARATUS

BACKGROUND OF THE INVENTION

The present invention generally relates to information signal recording apparatuses, and more particularly to an information signal recording apparatus for recording information signals on an information signal recording disc rotated in a constant angular velocity mode or in a constant linear velocity mode, in which the apparatus is capable of adapting to the respective rotation mode of the information signal recording disc to provide an optimal recording.

It is well known that rotation mode of an information signal recording disc (referred to hereinafter as a disc) is generally classified into two categories, one of which is a constant linear velocity mode (referred to hereinafter as CLV mode) in which the disc is rotated in such a manner that a relative linear velocity between the disc and a pickup or a head is maintained at a constant value (such a disc will be referred to hereinafter as a CLV disc); and a constant angular velocity mode (referred to hereinafter as CAV mode) in which the disc is rotated in such a manner that a rotation speed of the disc is maintained at a constant value (such a disc will be referred to hereinafter as a CAV disc). The CLV mode is intented to achieve a longer recording and reproducing time as compared to the CAV mode and maintains the relative linear velocity between the disc and the pickup at a velocity corresponding to the linear velocity of a CAV disc at a vicinity of the innermost portion of an information signal recording area of the CAV disc. As a result, there is a problem that an upper frequency limit of an information signal to be recorded on a CLV disc cannot be selected as high as the upper frequency limit of the information signal recorded on a CAV disc. In other words, frequency range of the information signal to be recorded on a disc should be changed responsive to the type of the disc.

The applicant of the present invention proposed in Japanese Patent Application No. 60-223164, filed Oct. 7, 1985, a disc pre-recorded with a discrimination signal indicating whether the disc is a CAV disc or a CLV disc, and a discrimination circuit for discriminating whether the disc is a CAV disc or a CLV disc on the basis of the discrimination signal. According to the above Japanese patent application, the discrimination signal is recorded together with a rotation controlling signal on a single track which is separated from an information signal recording area of the disc. Thus, the information signal recording area of the disc is not reduced. As a result of the above Japanese patent application, there exist now possibilities that rotation controlling signal and other informations are obtained in a short time, and that a switching of a carrier frequency of a frequency modulator of the information signal recording apparatus as well as a switching of motor servo operation of the information signal recording apparatus can be achieved quickly and automatically responsive to the discrimination signal.

Accordingly, the object of the present invention is to provide a novel and useful information signal recording apparatus for recording information signals on an information signal recording disc.

Another and more specific object of the present invention is to provide an information signal recording apparatus for recording information signals on an information signal recording disc, in which the apparatus is capable of discriminating whether the information signal recording disc is a CAV disc or a CLV disc and having an arrangement to switch a carrier reference frequency of a frequency modulator of the information signal recording apparatus from one frequency corresponding to one of the discs to another frequency corresponding to another disc responsive to the result of the discrimination. The term carrier reference frequency used herein and hereinafter indicates a particular reference frequency defined in a frequency spectrum of the carrier to specify the frequency range of the carrier. The carrier reference frequency may be selected for example at a center frequency of the carrier or any other frequencies of the carrier which specify the particular portion of the frequency spectrum of the carrier such as a frequency corresponding to a tip end of a synchronizing signal hereinafter referred to as synctip. According to the information signal recording apparatus of the present invention, the problems aforementioned are solved by switching the carrier reference frequency of the frequency modulator to an optimal frequency responsive to the result of the discrimination indicating that the disc is a CAV disc or a CLV disc.

In those cases where the disc is discriminated to be the CAV disc, the carrier reference frequency of the frequency modulator is selected at a higher frequency which is chosen to enable the recording on the disc at the innermost portion of the recording area of the disc. On the other hand, in those cases that the disc is discriminated to be a CLV disc, the carrier reference frequency is switched to a frequency lower than the corresponding carrier reference frequency for the case of the CAV disc. As a result, the CAV disc can be recorded with an information signal having a relatively broad frequency range. Thereby, the carrier reference frequency is selected at the higher frequency which is chosen such that the recording is possible even at the innermost region of the information signal recording area of the CAV disc where the frequency range possible for recording is lowest. On the other hand, in those cases that the disc is a CLV disc, long time recording of the information signal can be achieved with an optimal frequency range which corresponds to the linear velocity of the disc relative to the pickup or head.

Other objects and further features of the present invention will be apparent from the following detailed description when read in conjunction with the accompanying drawings.

DETAILED DESCRIPTION

Figure 1:
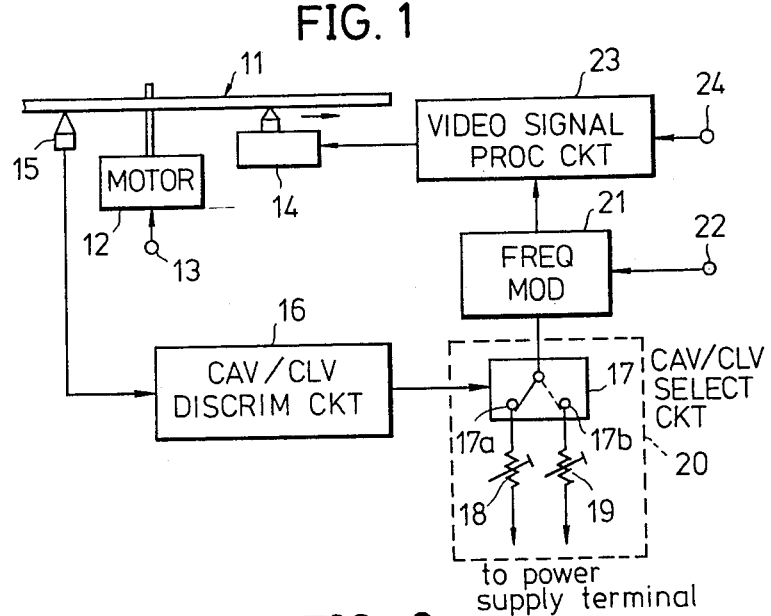
FIG. 1 is a system block diagram showing a preferred embodiment of the information signal recording apparatus according to the present invention.
Figure 2:
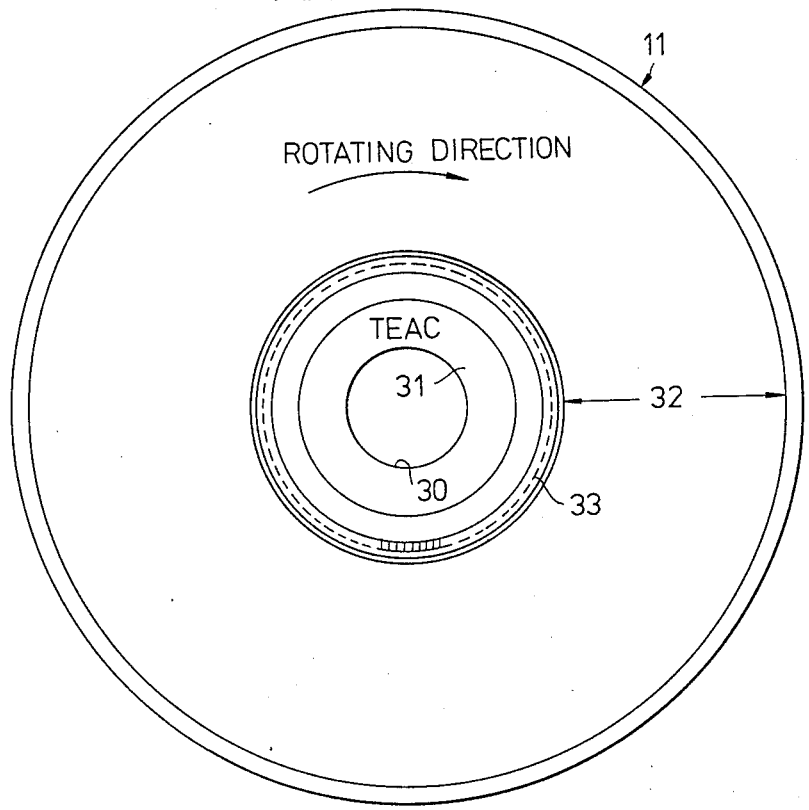
FIG. 2 is a plan view of an information signal recording disc used in the information signal recording apparatus of FIG. 1.

FIG. 1 is a system block diagram of an embodiment of the information signal recording apparatus of the present invention. In this apparatus, a video signal is recorded on an information signal recording disc (hereinafter referred to as a disc) 11 by a light beam as an information signal. The disc 11 is further recorded at the time the disc was produced with a discrimination signal indicating whether the disc is a CAV disc or a CLV disc prior to the recording of the video signal. FIG. 2 is a plan view of an example of the disc 11. A disc proposed by the present applicant in Japanese Patent Application 60-223164 may be used for this purpose.

Figure 3:
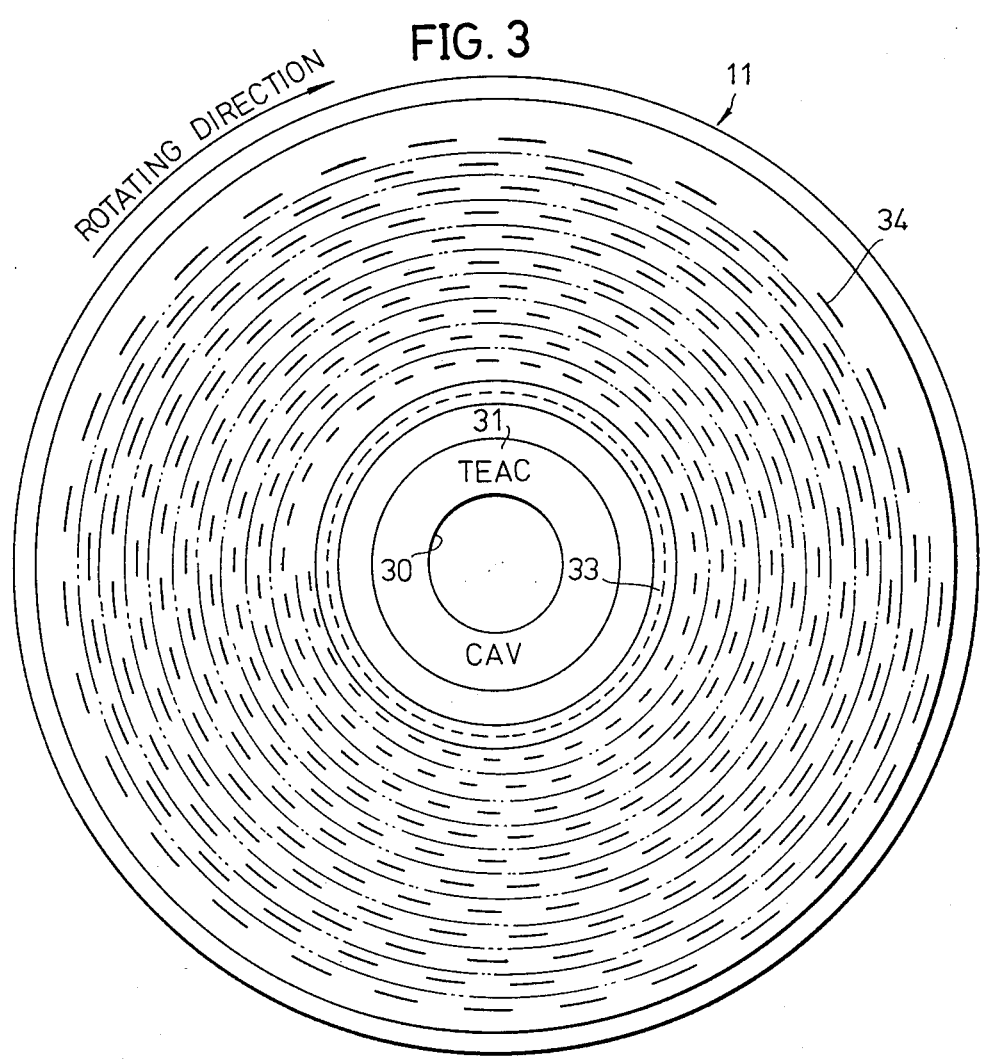
FIG. 3 is a plan view of a CAV disc showing an example of a row of information pits in a spirally formed track thereon.

The disc 11 in FIG. 2 may for example have a diameter of 30 cm, and has a center hole 30 at the central portion thereof. Further, a label portion 31 is provided around the center hole 30. Information signal such as a composite video signal and audio signal and the like are recorded on an information signal recording area 32 having a width of approximately 8.7 cm and extending between those portions defined by circles having radius of 5.5 cm and 14.2 cm and reproduced therefrom. In this information signal recording area 32, guide tracks are formed at the time of the production of the disc. This guide track may for example be an intermittent row of pits formed in such a manner that the individual pit locates alternatively in a radially inner position and in a radially outer position in each track. The length of each pit corresponds to one horizontal scanning interval (1 H) and the pitch of the track may be selected as 1.6 μm for example. The information signal is recorded on those disc portions locating between the adjacent guide tracks by a light beam. The recording is started from the innermost periphery of the information signal recording area toward the outer periphery thereof along a spiral path or a concentric path. The reproducing of the recorded information signal is carried out in a similar manner. In case the disc 11 is a CLV disc, a maximum recording time of 60 minutes can be achieved on one side of the disc. FIG. 3 shows an example of a row of pits formed on a CAV disc having a spiral track. As the disc is a CAV disc, the length of the individual pit 34 gradually increases from the inner portion of the disc toward the outer portion of the disc.

Further, the disc 11 has a rotation controlling signal recording track 33 of approximately 2 mm wide at an inner periphery region of the disc between the label portion 31 and the information signal recording area, separated from the information signal recording area with a non recorded region. This rotation controlling signal recording track 33 is recorded with a start code, a rotation mode discrimination signal indicating whether the disc 11 is a CAV disc or a CLV disc and a disc side discrimination signal indicating whether the disc surface is an "A" side or a "B" side together with the rotation controlling signal at the time the disc was produced.

The aforementioned label portion 31, information signal recording area 32 and the rotation controlling signal recording track 33 are also provided to the back side of the disc 11 as well. FIGS. 2 and 3 show the disc 11 as viewed from the upper position of the disc 11. In this disc 11, the recording and reproducing of the information signals and the reproducing of the rotation controlling signal and other signals from the rotation controlling signal recording track are carried out for the respective tracks formed at the lower side of the disc 11. The disc 11 in FIGS. 2 and 3 is shown to be rotated in a clockwise direction. Thus, the disc 11 is apparently rotated in a counter-clock wise direction if viewed from the direction of the recording or reproducing apparatus.

Figure 4:
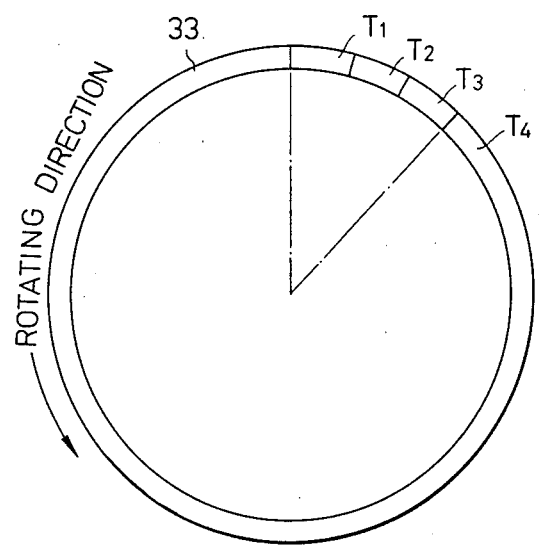
FIG. 4 is a diagram showing a rotation controlling signal recording track provided to the information signal recording disc of FIG. 2.

Next, the rotation controlling signal recording track 33 will be described in detail. FIG. 4 shows the rotation controlling signal recording track 33 on the disc 11 as viewed from the direction of the recording or reproducing apparatus (lower side). It should be noted that the direction of the rotation of the disc is apparently reversed as the disc 11 is viewed from the direction of the recording apparatus. The entire portion of the rotation controlling signal recording track 33 corresponds to a recording interval of one frame, that is, 525 H (hereinafter, the description will be given for the case of the NTSC system), in which a portion $T_1$ extends for the interval of 24 H and corresponds to a start code having a period of 6 H. The subsequent portion $T_2$ also extends for the interval of 24 H, wherein the rotation mode discriminating signal aforementioned indicating the respective rotation mode is recorded with respective predetermined periods. Further, subsequent to the portion $T_2$, another portion $T_3$ extending for the interval of 24 H is provided in which the aforementioned disc side discriminating signal is recorded with respective predetermined periods. The rest of the portion $T_4$ extends for the interval of 453 H and is recorded with a rotation controlling signal having a period of 3 H. The following table summarizes the relation between the contents to be discriminated by the rotation mode discrimination signal and the recording period thereof, and also a relation between the contents to be discriminated by the disc side discrimination signal and the recording period thereof.

|  | rotation mode discrimination signal | | disc side discrimination signal | |
|---|---|---|---|---|
| subject to be discriminated | CAV | CLV | "A" side | "B" side |
| recording period | 6H | 3H | 6H | 3H |

Figure 5:
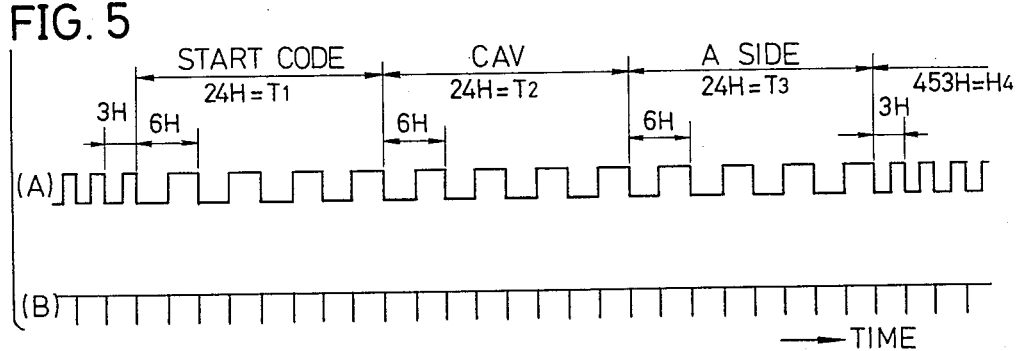
FIG. 5(A) is a diagram showing wave forms of the rotation controlling signal, a discrimination signal and other signals recorded on the rotation controlling signal recording track of FIG. 4.
FIG. 5(B) is a diagram showing a wave form of another rotation controlling signal derived from the signals in FIG. 5(A)

Thus, for those cases that the "A" side of a CAV disc is to be recorded or reproduced, a signal having a waveform as shown in FIG. 5(A) is reproduced from the rotation controlling signal recording track of the disc 11 rotated at a speed of 1800 rpm. Further, for those cases that a CLV disc is to be recorded or to be reproduced, the disc is again rotated at a constant speed of 1800 rpm for those intervals in which the rotation controlling singal recording track is reproduced. Thus, the rotation controlling signal recording track 33 is reproduced prior to the recording or reproducing of the information signal for both of the cases that the disc is a CAV disc and a CLV disc, and the period of the signals recorded therein is detected for the interval of 48 H which corresponds to the track portions of $T_2$ and $T_3$. On the basis of the result of the detection of the period, the disc is discriminated to be a CAV disc or a CLV disc, and the side of the disc is discriminated further. It should be noted that another rotation controlling signal having a period of 3 H throughout the entire frame as shown in FIG. 5(B) is also derived from those portions of $T_1$ through $T_4$. The rotation controlling signal in FIG. 5(B) is derived from a CAV/CLV discriminating circuit which is described in later and supplied to a terminal 13 in FIG. 1 through a servo controlling circuit (not shown).

Referring to FIG. 1 again, the disc 11 is rotated and synchronized by a motor 12. The motor 12 is controlled the rotation thereof on the basis of the rotation controlling signal supplied to the terminal 13 in such a manner that the linear velocity of the disc 11 relative to a head 14 is maintained at a constant value in case the disc 11 is a CLV disc. The motor 12 on the other hand is rotated at a constant speed when the disc 11 is a CAV disc.

When a signal is to be recorded on the disc 11, the rotation controlling signal recorded on the rotation controlling signal recording track 33 is first detected and reproduced by a photoreflector 15 used exclusively for this purpose. This reproduced signal is supplied to a CLV/CAV discriminating circuit 16. The CAV/CLV discriminating circuit 16 selectively reproduces the rotation mode discriminating signal included in the reproduced rotation controlling signal and discriminates whether the disc 11 is a CAV disc or a CLV disc. The output discrimination signal from the CAV/CLV discriminating circuit 16 is supplied to a switching circuit 17 as a switching signal. The construction and arrangement of the CAV/CLV discriminating circuit will be described in later.

The switching circuit 17 has terminals 17a and 17b, and variable resistors 18 and 19 are inserted between the respective terminals and a power supply terminal. The switching circuit 17 also has a common terminal connected to a frequency modulator 21. The frequency modulator 21 is supplied with a luminance signal through an input terminal 22 thereof and produces a frequency modulated luminance signal by frequency modulation of a carrier. Thereby, a carrier reference frequency which specifies a particular predetermined portion of the spectrum of the carrier is switched responsive to the case that the frequency modulator 21 is connected to the variable resistor 18 and to the case that the frequency modulator 21 is connected to the variable resistor 19. It is preferred to select the carrier reference frequency at a frequency corresponding to a synctip level of the luminance signal.

Thus, in case the disc is discriminated to be a CAV disc by the CAV/CLV discriminating circuit 16, the switching circuit 17 is switched to the side of the terminal 17a responsive to an output signal of the CAV/CLV discriminating circuit and connects the frequency modulator 21 to the variable resistor 18. With this connection, the frequency modulated luminance signal supplied from the frequency modulator 21 has a relatively high frequency range (such as a frequency range covering 5.2 MHz to 6.7 MHz) which is compatible with the recording at the innermost region of the recording area of the disc 11. On the other hand, in case the disc 11 was discriminated to be a CLV disc, the switching circuit 17 is switched to the side of the terminal 17b responsive to the output signal of the switching circuit 16 and the frequency modulator 21 is connected to the variable resistor 19 through the switching circuit 17. As a result, the frequency range of the frequency modulated luminance singal produced by the frequency modulator 21 has a relatively lower frequency range (a frequency range covering 4.7 MHz to 6.2 MHz) than the frequency range for the case of the CAV disc.

Figure 6:
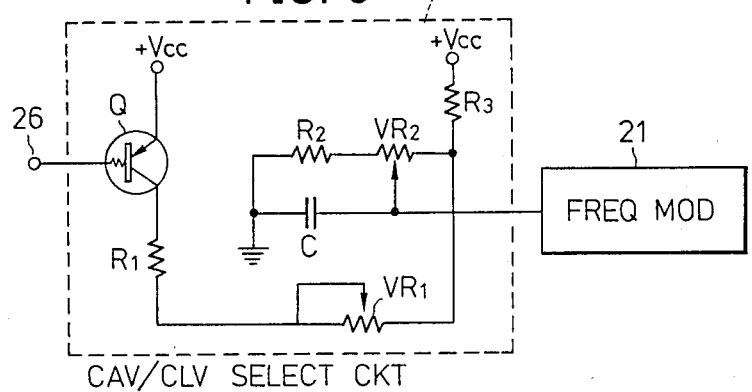
FIG. 6 is a circuit diagram showing an embodiment of a CAV/CLV selecting circuit shown in FIG. 1.

The switching circuit 17, variable resistor 18 and a variable resistor 19 constitute a CAV/CLV selecting circuit 20. FIG. 6 shows a circuit diagram of the circuit 20. In the drawing, a collector of a digital transistor (a PNP transistor including a resistor at the base thereof) Q is connected to a power supply terminal through a series connection of a resistor $R_1$, a variable resistor $VR_1$ and a resistor $R_3$. Further, a junction of the variable resistor $VR_1$ and the resistor $R_3$ is connected to the ground through a variable resistor $VR_2$ and a resistor $R_2$. The variable resistor $VR_2$ has a sliding terminal which is connected to the frequency modulator 21. The sliding terminal is also connected to the ground through a capacitor C.

In the circuit of FIG. 6, a high level discrimination signal is applied to the base of the transistor Q when the disc 11 is discriminated to be a CAV disc and the transistor Q is turned OFF. As a result a voltage determined by the resisters $R_2$, $R_3$, a variable resistor $VR_2$ and a voltage of the power supply terminal appears at the sliding terminal of the variable resistor $VR_2$ and supplied to the frequency modulator 21. This voltage corresponding to the voltage obtained through the variable resistor 18 of FIG. 1.

In case the disc 11 is discriminated to be a CLV disc, a low level signal is applied to an input terminal 26 and the transistor Q is turned ON. As a result, a voltage determined by the variable resistor $VR_1$, $VR_2$ and the voltage of the power supply terminal is supplied to the frequency modulator 21 and switches the carrier reference frequency thereof.

Thus, the frequency modulator 21 can produce two frequency modulated luminance signals having respective frequency ranges which are mutually different and one of the frequency modulated luminance signals is selectively supplied from the frequency modulator 21 in response to the result of the discrimination whether the disc 11 is a CAV disc or a CLV disc. In the present embodiment, the extent of deviation of the carrier frequency of the frequency modulated luminance signal is held at a constant value such as 1.5 MHz for both of the cases that the disc is a CAV disc and the disc is a CLV disc. Thus, a frequency demodulator can be used in common in a reproducing apparatus.

Figure 7:
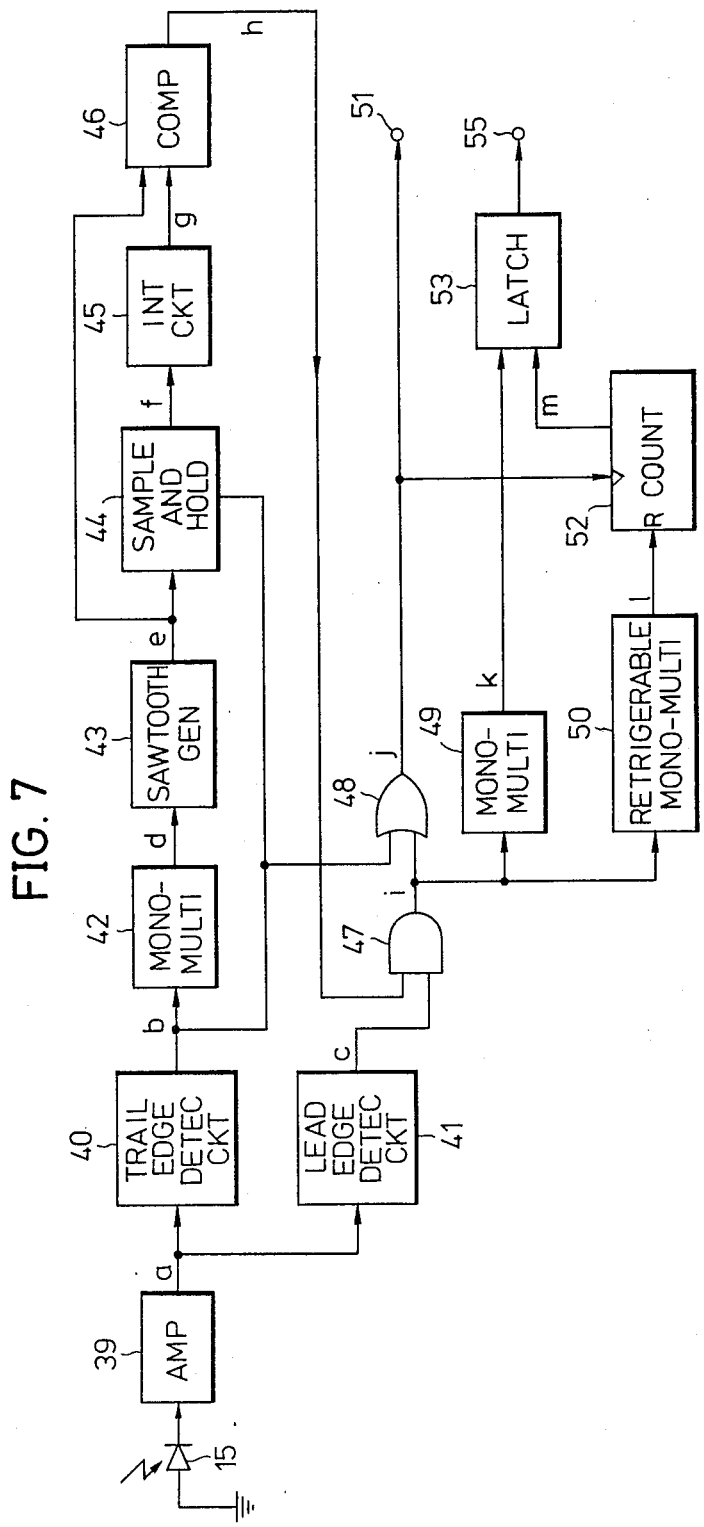
FIG. 7 is a system block diagram showing an embodiment of a CAV/CLV discriminating circuit shown in FIG. 1.
Figure 8:
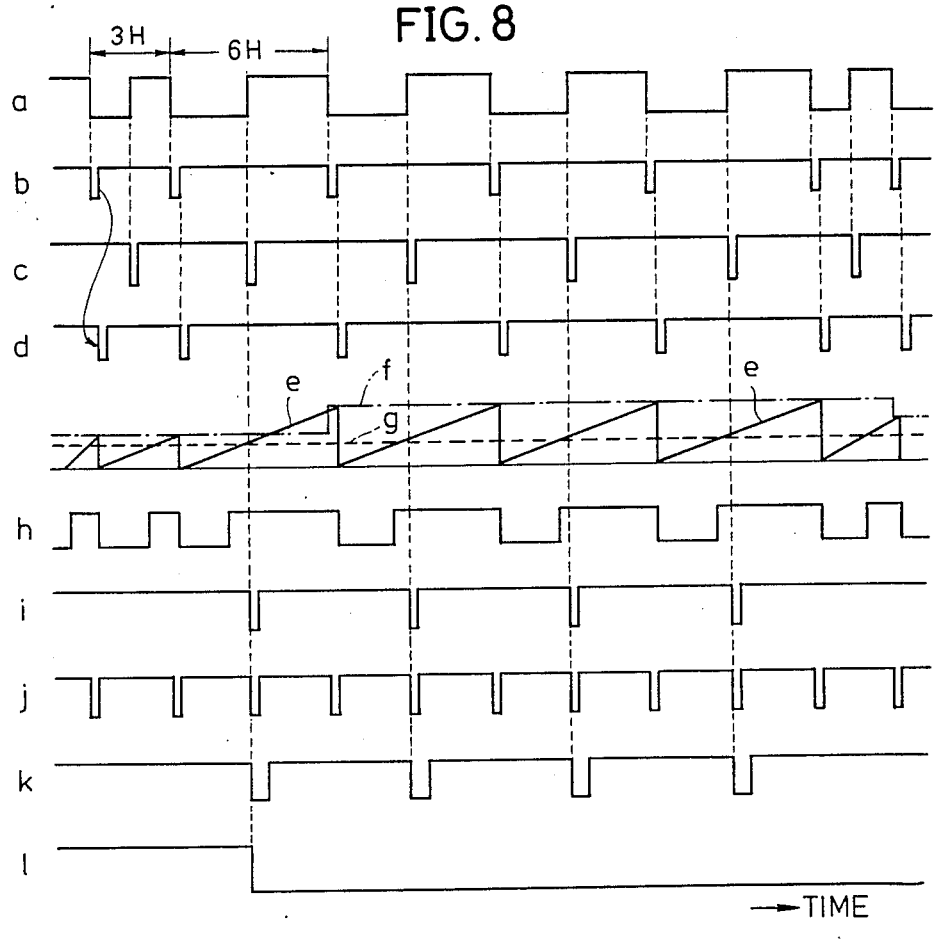
FIG. 8 is a timing diagram for use in the explanation of the operation of the CAV/CLV discriminating circuit shown in FIG. 1.

FIG. 7 is a system block diagram of a CAV/CLV discriminating circuit 16. A signal shown in FIG. 5(A) is detected by a photoreflector 15 in FIGS. 1 and 7 and converted into an electrical signal comprising a pulse train a (FIG. 8). The pulse train a is then supplied to a trailing edge detecting circuit 40 and detected the trailing edges thereof. The pulse train a is similarly supplied to a leading edge detecting circuit 41 and is detected the trailing edges thereof. The trailing edge detecting circuit 40 supplies a detection signal b to a monostable multivibrator 42 and triggers the multivibrator 42 in response to the trailing edge of the signal b. As a result, the monostable multivibrator 42 supplies a pulse d which maintains a low level state for a predetermined interval from the time of the triggering. The pulse d is then supplied to a sawtooth wave generator 43 which produces a sawtooth wave signal having a constant slope as shown in a solid line e in FIG. 8. The sawtooth wave signal e is supplied to a sample and hold circuit 44 which samples the sloping portion of the sawtooth wave signal responsive to a trailing edge of the detection signal b and holds the sampled level until the next trailing edge of the detection signal b is applied in the next time. From the sample and hold circuit 44, an output signal shown in FIG. 8 by a one-dotted line f is obtained.

The output signal f of the sample and hold circuit 44 is supplied to an integrating circuit 45 for integration, and a signal g shown in a dashed line in FIG. 8 is obtained. This signal g has a level corresponding to 80% of the peak level of the sawtooth wave signal e. The signal g is supplied to a comparator circuit 46, in which the signal g is compared the level thereof with the level of the sawtooth wave signal e and an output signal h as shown in FIG. 8 is produced. The signal h is then supplied to an AND circuit 47. The AND circuit 47 is also supplied with a leading edge detection pulse c from the leading edge detecting circuit 41 in FIG. 7 and produces a logical product signal i as shown in FIG. 8. Thus, the AND circuit 47 gates the leading edge detection pulse c for only those instances that a pulse having a period of 6 H such as the start code or one of the CAV/CLV discrimination signal is applied as the input signal a. This relation holds even if the rotation speed of the disc is changed. The output pulse i of the AND circuit 47 is supplied to an OR circuit 48 which produces a logical sum of the output pulse i and the edge detection pulse b as an output pulse j as shown in FIG. 8. The output pulse i is further supplied to a monostable multivibrator 49 and a retriggerable monostable multivibrator 50, respectively.

Figure 9:
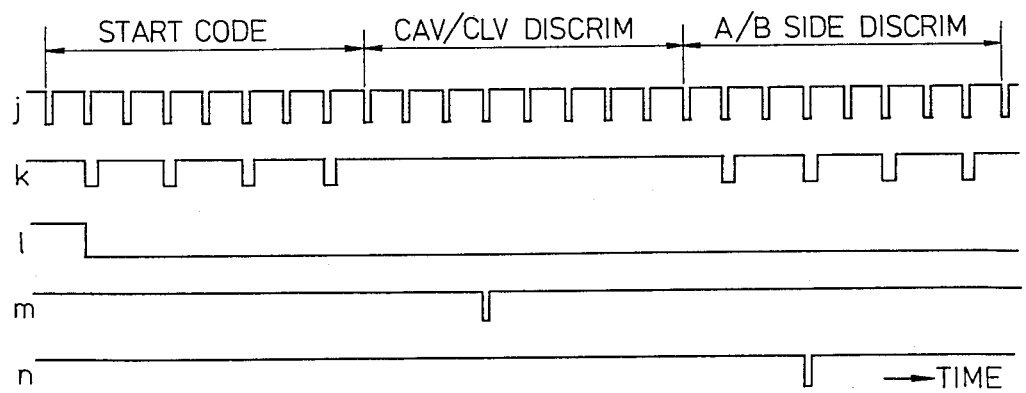
FIG. 9 is a timing diagram similar to FIG. 8 for use in the explanation of the operation of the CAV/CLV discriminating circuit.

The output pulse j is a pulse having a period of 3 H and synchronized in phase to the leading and trailing edges of the reproduced signal pulse a. This output pulse j is supplied to an output terminal 51 and used as the rotation controlling signal with a period of 3 H shown in FIG. 5(B). The output pulse j is further supplied to a counter 22 which counts the number of the pulses. The monostable multivibrator 49 aforementioned is triggered responsive to a trailing edge of the pulse i and produces a pulse k which is switched to a low level responsive to the triggering and maintains this low level for a predetermined relatively long interval. The pulse k is supplied to a latch 53. The retriggerable monostable multivibrator 50 has a time constant selected to be a relatively large value such as 30 H or more and produces an output pulse l shown in FIGS. 8 and 9 which assumes a low level responsive to the triggering. This pulse l is supplied to the counter 52 and resets the counter 52 responsive to a trailing edge thereof.

The counter 52 counts a predetermined number of the pulse j supplied thereto from the time of the last reset of the counter 52 and produces a negative output pulse m to a latch 53 as a latch pulse every time the count number reaches a predetermined number such as ten. The latch 53 latches the pulse k supplied thereto responsive to a leading edge of the latch pulse m.

It should be noted that the latch pulse m is produced only for those intervals corresponding to the CAV/CLV discrimination signal recorded portion $T_2$ of FIG. 4, while the pulse k takes the form of the negative pulse train of period 6 H only for those intervals where the signal a has a period of 6 H. Otherwise, the pulse k assumes a constant high level. Thus, the CAV/CLV discrimination signal which assumes a high level when the disc is a CAV disc and a low level when the disc is a CLV disc is produced and supplied to an output terminal 55.

The information signal recording apparatus of FIG. 1 further comprises a recording video signal processing circuit 23 supplied with a carrier chrominance signal from an input terminal 24 and produces a frequency division multiplexed recording signal in which the carrier chrominance signal is inserted to a low frequency range not occupied by the frequency modulated luminance signal aforementioned. Thereby, the recording video signal processing circuit 23 converts the frequency range of the input carrier chrominance signal to the low frequency range. The frequency division multiplexed recording signal from the recording video signal processing circuit 23 is supplied to a recording head 14 and a recording is carried out to the disc 11 responsive to the variation of the intensity of a light beam radiated from the recording head 14.

Thus, the information signal recording apparatus according to the present invention can achieve the recording on a CAV disc and a CLV disc using respectively optimal frequency ranges and can adapt to the type of the disc automatically and quickly.

Further, the present invention is not limited to these embodiments, but various variations and modifications may be made without departing from the scope of the present invention.

What is claimed is:

1. An information signal recording apparatus for recording an information signal on an information signal recording disc having a rotation controlling signal recording track pre-recorded with a rotation controlling signal including a rotation mode discrimination signal, said rotation mode discrimination signal indicating whether the information signal recording disc is to be rotated in a constant angular velocity mode or in a constant linear velocity mode, said information signal recording apparatus comprising:

reproducing means for reproducing said rotation controlling signal recorded on said rotation controlling signal recording track;

a motor for rotating said information signal recording disc responsive to said reproduced rotation controlling signal;

mode discriminating means for discriminating whether said information signal recording disc is to be rotated in said constant angular velocity mode or in said constant linear velocity mode responsive to said rotation mode discrimination signal within said rotation controlling signal reproduced by said reproducing means;

frequency modulation means supplied with a luminance signal for producing a frequency modulated luminance signal, said frequency modulation means changing a predetermined carrier reference frequency responsive to a discrimination result in said mode discriminating signal, said carrier reference frequency specifying a predetermined frequency portion of a spectrum of said carrier;

processing means supplied with said frequency modulated luminance signal and a carrier chrominance signal for producing a recording video signal; and recording means for recording said recording video signal on said information recording disc.

2. An information signal recording apparatus as claimed in claim 1 further comprises mode selecting means for producing a switching signal responsive to the discrimination result in said mode discriminating means to change the predetermined carrier reference frequency of said frequency modulation means.

3. An information signal recording apparatus as claimed in claim 2 in which said mode selecting means comprises a first resistor, a first variable resistor and a second resistor connected in series across a power supply terminal and a ground terminal, a transistor having an emitter connected to said power supply terminal, a third resistor and a second variable resistor connected in series between a collector of said transsistor and a junction of said first resistor and said first variable resistor, said transistor being turned ON and turned OFF responsive to the discrimination result in said mode discriminating means, said switching singal having a level adjustable by resistance of said first and second variable resistors.

4. An information signal recording apparatus as claimed in claim 1 in which said predetermined carrier reference frequency of said frequency modulation means is switched between a first frequency corresponding to said constant angular velocity mode and a second frequency corresponding to said constant linear velocity mode.

5. An information signal recording apparatus as claimed in claim 1 in which said rotation mode discrimination signal comprises a train of pulses having a period which is a multiple of a horizontal scanning interval, the period of said rotation mode discrimination signal indicating one of said rotation mode being different from the period of said rotation mode discrimination signal indicating another rotation mode.

6. An information signal recording apparatus as claimed in claim 5 in which said mode discriminating means comprises trailing edge detecting means supplied with said rotation mode discrimination signal from said reproducing means for detecting a trailing edges thereof, sawtooth wave generating means triggered with an output pulse of said trailing edge detecting means for producing an output sawtooth wave signal, sample and hold means for sampling and holding said output sawtooth wave signal from said sawtooth wave generating means responsive to the output pulse of said trailing edge detecting means, integrating means for integrating an output signal of said sample and hold means, comparator means for comparing an output signal from said integrating means and the sawtooth wave signal from said sawtooth wave generating means, leading edge detecting means supplied with said rotation mode discrimination signal for detecting leading edges thereof, logical product means for producing a logical product signal of an output signal from said leading edge detecting means and an output signal from said comparator means, and latch means latched by an output signal of said logical product means, said logical product means producing the output signal only when the period of said rotation mode discrimination signal is different from the period of said rotation controlling signal portion, said latch means producing a high level or a low level signal responsive to said rotation mode discrimination signal included in said rotation controlling signal recorded in said rotation controlling signal recording track.

7. An information signal recording apparatus as claimed in claim 1 in which said reproducing means reproduces said rotation controlling signal recording track comprising a rotation controlling signal recording portion recorded with a rotation controlling signal portion and a rotation mode discrimination signal recording portion recorded with said rotation mode discrimination signal, said rotation mode discrimination signal indicating one of said rotation mode having a period equivalent to a period of said rotation controlling signal portion, said rotation mode discrimination signal indicating another rotation mode having a period which is changed from the period of said rotation mode discrimination signal indicating said one of the rotation mode.

8. An information signal recording apparatus as claimed in claim 1 in which said reproducing means reproduces said rotation controlling signal recording track provided on a portion of said information signal recording disc locating radially inner side of an information recording area thereof with an unrecorded zone therebetween.

9. An information signal recording apparatus as claimed in claim 1 in which said rotation mode discrimination signal on said rotation controlling signal recording track is reproduced by said reproducing means prior to recording of an information signal on said information signal recording disc by said recording means for discriminating whether the information signal recording disc should be rotated in said constant angular velocity mode or in said constant linear velocity mode.

* * * * *